Patented June 2, 1936

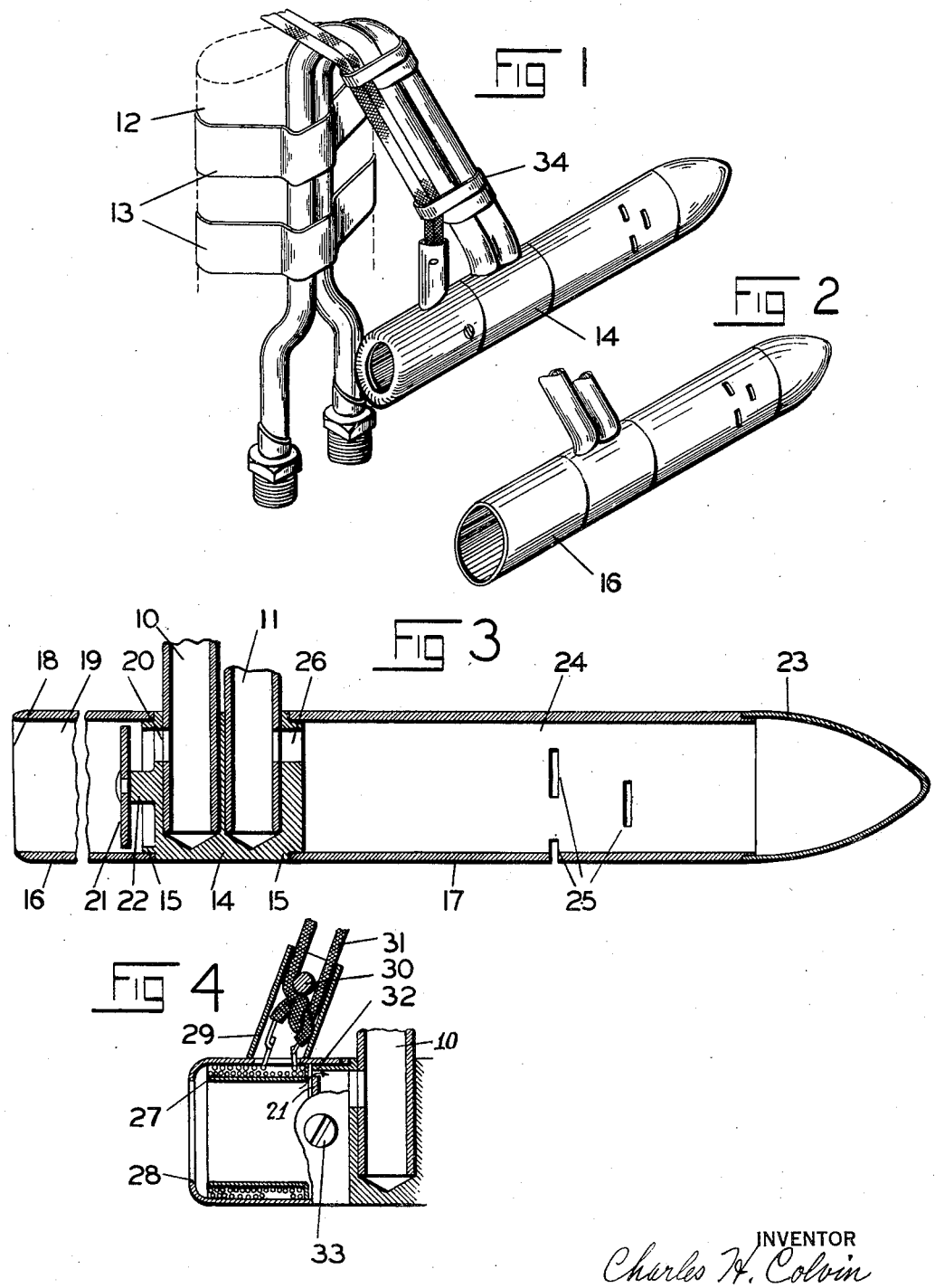

2,042,700

UNITED STATES PATENT OFFICE 2,042,700

PITOT-STATIC TUBE

Charles H. Colvin, Morristown, N. J., assignor to Pioneer Instrument Company, Incorporated, Brooklyn, N. Y., a corporation of New York Application March 14, 1928, Serial No. 261,466
Renewed June 26, 1935

15 Claims. (Cl. 73—212)

This invention relates to Pitot-static tubes such as may be used for the determination of the velocity of fluids, and particularly to such tubes as may be used on aircraft.

Among the objects of this invention is to produce a Pitot-static tube unit of simple design which is easy to assemble and which is characterized by possessing qualities rendering it particularly efficient for use in obtaining air speed from aircraft.

Another object of the invention embodies a construction whereby the forming of ice or the packing of snow at the entrance of the Pitot tube, or within the chamber which communicates with the moving air, may be obviated so that proper functioning of the Pitot tube may be assured when flying during cold weather or in inclement weather.

With these and incidental objects in view the invention consists of certain novel features of construction and combination of parts, the essential elements of which are set forth in the appended claims and a preferred form of embodiment of which is described hereinafter with reference to the drawing which accompanies and forms part of the specification.

In the drawing:

Fig. 1 is a perspective view of my Pitot-static tube unit and shows the manner by which it may be attached to a strut of an aircraft;

Fig. 2 is an outside view of the Pitot-static tube unit without a heating device;

Fig. 3 is a vertical longitudinal section taken through the laterally extending chambers of the Pitot-static unit illustrated in Fig. 2; and Fig. 4 is a vertical longitudinal section of the heating device of the Pitot-static unit illustrated in Fig. 1.

The Pitot-static tube unit comprises two tubes for transmitting fluid pressures, one of these tubes 10 is utilized for transmitting pressures due to velocity head and the other of these tubes 11 is utilized for transmitting pressures due to static or pressure head. These tubes are illustrated as running upwardly along a strut 12 to which they are adapted to be secured by fastening means such as straps 13. In the form shown, the tubes 10, 11 are bent downwardly and extend away from the strut in order that their extremities may come into contact with air which is free from air disturbances such as are created by eddy currents occurring about members moving through the air.

The extremities of the tubes 10, 11 are adjacent one another and extend within a member 14 which is drilled to receive them. Member 14 is of a cylindrical formation with its axis extending lateral to the axes of the tubes 10, 11. Each of the two ends of the member 14 has a machined collar 15, Fig. 3, to which are fastened hollow tubular elements 16, 17.

Element 16 is open ended and faces in the direction in which the aircraft is moving in order that it will receive the impact of air traveling past the aircraft. The forward edge 18 of element 16 preferably is beveled or rounded and it is desirable that the length of this element be such as to enable it to extend well in advance of tubes 10, 11 by which the Pitot-static tube unit is supported.

The air within chamber 19 is under a velocity head pressure due to the relative motion of the aircraft and the air and this pressure is communicated to the velocity head pressure tube through an opening 20 in member 14 and tube 10 which connects chamber 19 with tube 10. While a connection between chamber 19 and tube 10 may occur in any other place, it is of advantage to place it close to the upper portion of chamber 19 so that water may run out of the forward end of chamber 19 and not enter tube 10.

Just in advance of opening 20 there is disposed a baffle 21 which is mounted upon a stud 22 extending from member 14. Free transmission of fluid pressure about the periphery of this baffle is had.

The hollow tubular element 17 extends from the rear end of member 14 in a direction which is opposite to that of element 16. Its rear end is closed by a bullet shaped cap 23 which is conducive to obtaining a good stream-line effect. Chamber 24 within the element is in open communication with the atmosphere by a number of slots 25 in the wall of the tubular element. Preferably the slots should be disposed at the sides or under wall of the tubular element. Tubular element 17 is sufficiently long to enable the slots 25 to be placed well out of the way of air pockets or eddy currents about tubes 10, 11.

Chamber 24 is always in communication with the static or pressure head tube 11 by means of an opening 26 which extends through tube 11 and member 14. This opening 26 together with opening 20 may be made after the extremities of tubes 10, 11 have been inserted within the holes which have been drilled in member 14 to receive them. When the hollow tubular elements 16, 17 are mounted upon member 14 and are secured thereto by force fits or by solder, the Pitot-static tube unit is complete and ready for mounting upon an aircraft. The individual elements which make up the unit are few in number and, owing to the simplicity of their interconnections, the unit is easily assembled.

In Figs. 1 and 4 I have illustrated a heating device which is adapted to maintain the velocity head chamber free from ice or snow, which may tend to gather therein when flying in cold weather or during a storm. As is well understood, chamber 19 is fully exposed to the air currents passing an aircraft and snow which is likely to pack therein might render the velocity head tube inoperable. The heating device comprises a coil 27 disposed concentrically with the inner wall of a tubular element 28 which is designed for this purpose. The tubular element 28 has a lead-in tube 29 which supports an anchor pin 30 about which the leads 31 are secured. The tubular element may be secured to a collar 32 of member 14 by means of a screw 33 and it will be evident that the tubular elements 16, 28 and collars 15, 32 may have such dimensions as to render interchangeable a tubular element not having a heating device and one having such a device. The leads may be fastened to tubes 10, 11 by means of straps 34.

What I claim is:

1. A Pitot-static tube unit, comprising in combination, a velocity head tube and a pressure head tube having their extremities adjacent one another, a member encasing said extremities of said tubes, said member having holes on opposite sides thereof communicating with said tubes respectively, an open ended hollow element secured to said member opposite one of said holes, and another hollow element having one end only open and secured to said member opposite the other of said holes, said last named element having holes in the wall thereof.

2. The combination set forth in claim 1 in which the open ended hollow element is provided with means for heating the interior thereof.

3. A Pitot-static tube unit, comprising in combination, a velocity head tube and a pressure head tube, a member closing the open ends of said tubes, a pair of hollow elements carried by said member and extending laterally of said tubes in opposite directions, one of said hollow elements forming an open ended chamber and the other of said elements forming a chamber closed at its free end and communicating with the atmosphere through openings in its wall, said member and tubes having openings permitting communication of the open ended chamber with the velocity head tube and permitting communication of the chamber of the last named hollow element with the pressure head tube.

4. A Pitot-static tube unit, comprising in combination, a chamber, one end of which is open to receive the impact of an air stream, a second chamber, the sides of which have holes connecting it to the surrounding air, a member interposed between said first chamber and said second chamber and supporting the same, and supporting means attached to said member, said member and said supporting means being provided with two passages, one of which connects to the first chamber and the other of which connects to the second chamber.

5. A Pitot-static tube unit, comprising in combination, a chamber, one end of which is open to receive the impact of an air stream, a second chamber, the sides of which have holes connecting it to the surrounding air, a member interposed between said first chamber and said second chamber and supporting the same, supporting means attached to said member, said member and said supporting means being provided with two passages, one of which connects to the first chamber and the other of which connects to the second chamber, and said first named chamber being provided with a heating device.

6. A Pitot-static tube unit comprising, in combination, two hollow tubular elements of equal cross-sectional dimensions and axially disposed in respect to each other, the outer end of one of said elements being open and the outer end of the other of said elements being closed, a supporting member for said hollow tubular elements, said supporting member being coextensive and in engagement with the inner ends of said two elements and having separate chambers in communication with the inner spaces of said hollow tubular elements respectively, and individual tubes connected respectively with the separate chambers of said member.

7. In combination, a Pitot-static tube unit comprising three hollow cylindrical elements coaxially disposed in respect to each other, one of said elements forming an open ended chamber to receive the impact of fluid, another of said elements forming a chamber closed except for openings through which only the static pressure of the surrounding fluid may be transmitted to the interior of its chamber, and the third element having individual chambers connected respectively with the chambers of the first two described elements and disposed between the latter.

8. The combination set forth in claim 7 including collars extending from the third element into the other two elements, respectively, for joining the three elements together, and eliminating overlapping seams at the joints.

9. A Pitot-static tube unit comprising, in combination, a hollow element having an opening for receiving the impact of air moving relatively to the element, another hollow element extending rearwardly of said first named element and in coaxial alignment therewith, said last named hollow element having openings to the atmosphere only in its side and under wall, connecting means intermediate said hollow elements and having communication therewith, and tubes joined to said connecting means at its upper surface and communicating with the interiors of said hollow elements, respectively, through said means, whereby vortex disturbance in the vicinity of the openings of said hollow elements is minimum.

10. A Pitot-static tube unit comprising, in combination, a hollow element having openings in its side wall to permit atmospheric pressure to obtain within the element, another hollow element having an opening for receiving the impact of air passing along the last named hollow element, tubes for transmitting pressures due to static head and velocity head, and means connecting the chambers of said hollow elements, respectively, with said tubes, said means comprising a third element disposed coaxially with and between the two hollow elements and including openings above the lower portions of the respective chambers of said hollow elements, whereby water collected in said chambers may not render inoperable the Pitot-static tube.

11. A Pitot-static tube unit comprising, in combination, a velocity head tube and a pressure head tube, means adapted for connecting the chambers of said tubes with a differential pressure controlled device, and an electrically heated coil within said velocity head tube for preventing the collection of water, snow and ice therein.

12. A Pitot-static tube unit comprising, in combination, a velocity head tube and a pressure head tube, means adapted for connecting the chambers of said tubes with a differential pressure controlled device, said means including openings above the lower portions of said tubes, respectively, a baffle disposed across a portion of said velocity head tube, and a heating device lining the wall of said velocity head tube, whereby said velocity head tube may not be rendered inoperable during use because of inclement or freezing conditions.

13. In combination with a Pitot tube having two chambers, one of which is arranged to receive the impact of an air stream for transmitting velocity pressures, and the other of which is open to the surrounding atmosphere but unaffected by the air stream for transmitting static pressures of a heating coil disposed concentrically with the inner wall of the velocity pressure chamber for preventing the formation of ice on said Pitot tube.

14. A Pitot-static tube unit having two coaxially extending chambers, one of which is open at one end to receive the impact of an air stream for transmitting velocity pressures, and the other of which is open to the surrounding atmosphere but is unaffected by the air stream for transmitting static pressures, and a heating device carried by said unit and disposed coaxially with said velocity chamber for maintaining the latter free from ice or snow while permitting the passage of the air stream therethrough without obstruction by said heating device.

15. In combination with a Pitot tube having two chambers, one of which is arranged to receive the impact of an air stream for transmitting velocity pressures, and the other of which is open to the surrounding atmosphere but unaffected by the air stream for transmitting static pressures, of a heating coil carried by said tube and disposed concentrically with the velocity pressure chamber for preventing the formation of ice on said tube.

CHARLES H. COLVIN.